United States Patent
Greene

(10) Patent No.: US 6,344,520 B1
(45) Date of Patent: Feb. 5, 2002

(54) ADDITION-CROSSLINKABLE EPOXY-FUNCTIONAL ORGANOPOLYSILOXANE POLYMER AND COATING COMPOSITIONS

(75) Inventor: James D. Greene, Adrian, MI (US)

(73) Assignee: Wacker Silicones Corporation, Adrian, MI (US)

(*) Notice: Subject to any disclaimer, the term of this patent is extended or adjusted under 35 U.S.C. 154(b) by 0 days.

(21) Appl. No.: 09/339,141

(22) Filed: Jun. 24, 1999

(51) Int. Cl.$^7$ .................................................. C08F 8/00
(52) U.S. Cl. ........................ 525/100; 525/476; 528/34; 528/39; 524/588
(58) Field of Search ................... 528/39, 34; 525/100, 525/476; 524/588

(56) References Cited

U.S. PATENT DOCUMENTS

| | | | |
|---|---|---|---|
| 4,113,665 A | | 9/1978 | Law et al. |
| 4,208,503 A | | 6/1980 | Martin |
| 4,250,074 A | | 2/1981 | Foscante et al. |
| 4,385,134 A | | 5/1983 | Foscante et al. |
| 4,532,299 A | | 7/1985 | Seneker |
| 4,647,479 A | | 3/1987 | Montes |
| 5,275,645 A | | 1/1994 | Ternoir er al. |
| 5,280,098 A | * | 1/1994 | Witucki et al. ............... 528/17 |
| 5,415,688 A | | 5/1995 | Gasmena et al. |
| 5,417,744 A | | 5/1995 | Gasmena |
| 5,516,858 A | * | 5/1996 | Morita et al. ............... 525/478 |
| 5,520,952 A | | 5/1996 | Tanitsu et al. |
| 5,618,860 A | | 4/1997 | Mowrer et al. |
| 5,650,474 A | * | 7/1997 | Yamaya et al. ............... 528/12 |
| 5,663,215 A | | 9/1997 | Milligan |
| 5,703,178 A | | 12/1997 | Gasmena |
| 5,736,619 A | | 4/1998 | Kane et al. |
| 5,804,616 A | | 9/1998 | Mowrer et al. |

FOREIGN PATENT DOCUMENTS

| | | | |
|---|---|---|---|
| EP | 0 581 545 A1 | | 7/1993 |
| JP | 3-47840 | * | 12/1998 |
| JP | 10316932 | * | 12/1998 |
| WO | 96 25 445 | * | 8/1996 |
| WO | WO 97/11983 | | 4/1997 |

OTHER PUBLICATIONS

English Derwent Abstract Corresponding To XP–002142930 (AN 1998–191841 [17]).

* cited by examiner

Primary Examiner—Margaret Moore
(74) Attorney, Agent, or Firm—Brooks & Kushman P.C.

(57) ABSTRACT

The present invention pertains to an epoxy-functional organopolysiloxane resin, and an epoxy-functional organopolysiloxane coating composition comprising the epoxy-functional organopolysiloxane resin. The epoxy-functional organopolysiloxane resin which contains repeating units having the formulae:

| | |
|---|---|
| $E_a R_b^1 R_c^2 SiO_{1/2}$ | (M units) |
| $E_a R_b^1 R_c^2 SiO_{2/2}$ | (D units) |
| $E_a R_b^1 R_c^2 SiO_{3/2}$ | (T units) |
| $SiO_{4/2}$ | (Q units) | wherein

E is an epoxy-functional $C_{1-18}$ hydrocarbon group containing one or more oxygen atoms, provided that no oxygen atom is directly bonded to a Si- atom; and $R^1$ and $R^2$ are independently a $C_{1-20}$ hydrocarbon, optionally interspersed with a heteroatom linking group, a is an integer of 0, 1, or 2, preferably 0 or 1;

b is an integer of 0, 1, 2 or 3, preferably 0, 1, or 2;

c is an integer of 0, 1, 2 or 3, preferably 0, 1, or 2; and in M units, a+b+c=3, in D units, a+b+c=2, in T units, a+b+c=1, with the proviso that the molecule, on average, contain at least two E components.

13 Claims, No Drawings

ADDITION-CROSSLINKABLE EPOXY-FUNCTIONAL ORGANOPOLYSILOXANE POLYMER AND COATING COMPOSITIONS

TECHNICAL FIELD

The present invention relates to an addition-crosslinkable epoxy-functional organopolysiloxane polymer useable to make a coating composition having high weather and chemical resistance, and more particularly, to a weather and chemical resistant coating composition comprising an addition-crosslinkable epoxy-functional organopolysiloxane polymer.

BACKGROUND ART

Protective coatings used for industrial equipment, manufacturing facilities, oil-drilling platforms and above water marine applications face exposure to corrosive and ultraviolet (U.V.) light environments. These environments often cause harm to these coatings which may require frequent repainting of the underlying substrate. These protective coatings typically include a crosslinkable resin system, which acts as a binder, a hardener (i.e., a crosslinking agent), flow additives and optional pigments. The crosslinkable resin system typically comprises one resin, but may also comprise two or more resins. The resins which have been typically used for these applications are based on epoxy resins (aromatic and aliphatic), condensation curable polysiloxanes, silicone alkyds, urethanes and silicone polyesters.

Coatings based on aromatic epoxy resins provide acceptable results when resistance to chemical and corrosive environments are necessary. However these coatings often fail when exposed to U.V. light, such as that found in sunlight, and tend to chalk when used as a topcoat on exterior applications. Coatings based on aliphatic epoxy resin react relatively slowly, but are somewhat less susceptible to damage from U.V. light then their aromatic counterparts.

Coatings based on urethanes have been used when the application requires corrosion resistance and weather resistance with an ambient cure response. However, these materials are considered to be toxic due to the possibility of minute amounts of free isocyanate present. Moreover, they are generally high in volatile organic components (VOC's).

Coatings based on silicone alkyds have been used for applications requiring an ambient cure schedule and high temperature resistance. The silicone alkyds provide good U.V. light resistance and since it contains between 20–30% (by wt.) silicone it also useful for high temperature resistance. However, in the presence of water and heat, the silicone-alkyd polymer may break down into its starting components. Once this occurs the alkyd will continue to oxidize and form water-soluble polymers. Coatings based on silicone polyesters are used for baking enamels in which high temperature and weather resistance is important, however they also contain the same reversible reaction as silicone-alkyds, which results in the formation of polyester and silicone polymers.

Recently, coatings formed of interpenetrating networks (IPN) containing polysiloxanes have been used. These polysiloxanes utilize the alkoxy functionality on the silicone to crosslink, and often require a moisture curing mechanism and a high energy pre-hydrolysis step. These compositions may also require a high degree of alkoxy functionality on the silanes and polysiloxane components, which, after curing, will have a high VOC due to the evolution of alcohol as a byproduct. In addition, these coatings will tend to wrinkle if a good cure is not achieved throughout the film, due to a continuation of the cure after exposed to moisture and heat (sunlight). The byproducts are normally methanol, however in some cases butanol or propanol can be present.

It would be desirable to provide a coating composition which is resistant to corrosion and exhibits U.V. light and heat resistance as well. It would also be desirable to provide a coating composition which can be used in low VOC formulations and can be formulated using solvents which are considered non-hazardous air pollutants. It would be further desirable to provide a coating composition which the crosslinking mechanism is primarily an addition reaction, and which renders no or fewer by-products as would be found in the cold blended silicone polymers.

DISCLOSURE OF INVENTION

The present invention pertains to an epoxy-functional organopolysiloxane polymer, and a method of making the same. The present invention also pertains to an epoxy-functional organopolysiloxane coating composition comprising the epoxy-functional organopolysiloxane polymer, and a method of making the same.

The epoxy-functional organopolysiloxane polymer is preferably a mildly crosslinked epoxy-functional organopolysiloxane resin and contains at least one or more of the repeating units having the formulae:

$E_a R_b^1 R_c^2 SiO_{1/2}$ (M units) 

$E_a R_b^1 R_c^2 SiO_{2/2}$ (D units) 

$E_a R_b^1 R_c^2 SiO_{3/2}$ (T units) 

$SiO_{4/2}$ (Q units) 

wherein

E is an epoxy-functional $C_{1-18}$ hydrocarbon group containing one or more oxygen atoms, provided that no oxygen atom is directly bonded to a S- atom; and $R^1$ and $R^2$ are independently a $C_{1-20}$ hydrocarbon, optionally interspersed with a heteroatom linking group such as, but not limited to,

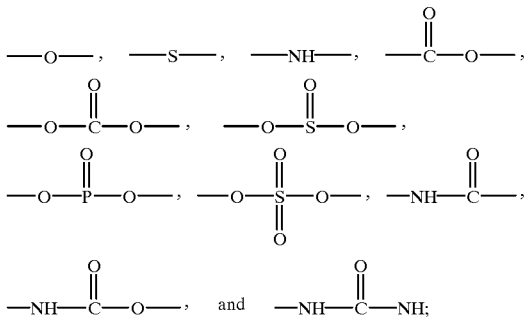

a is an integer of 0, 1, or 2, preferably 0 or 1;

b is an integer of 0, 1, 2 or 3, preferably 0, 1, or 2;

c is an integer of 0, 1, 2 or 3, preferably 0, 1, or 2; and in M units, a+b+c=3, in D units, a+b+c=2, in T units, a+b+c=1, with the proviso that the molecule, on average, contain at least two E components.

E is preferably an epoxy-functional $C_{2-15}$ hydrocarbon group, more preferably a $C_{3-12}$ hydrocarbon group, and even more preferably a $C_{3-6}$ hydrocarbon group. E is most preferably glycidoxypropyl

$(CH_2\text{—}CHCH_2OCH_2CH_2CH_2\text{—})$.

Preferably, the $R^1$ and $R^2$ are individually $C_{1-18}$ alkyl, $C_{6-20}$ aryl, $C_{7-18}$ alkylaryl, $C_{7-18}$ arylalkyl, $C_{5-12}$ cycloalkyl, $C_{2-18}$ alkenyl, glycol, epoxy (provided that the oxygen atom is not bonded directly to a Si- atom), $C_{1-18}$ alkoxy, $C_{2-20}$ unsaturated hydrocarbons such as vinyl, allyl, propenyl, isopropenyl and terminal $C_{4-18}$ alkenyl, alkynyl, vinyl ether, and allyl ether groups.

More preferably, $R^1$ and $R^2$ are independently methyl, ethyl, vinyl, allyl, methoxy, ethoxy, and phenyl groups.

If T units are present, the molecule may contain or form silsesquisiloxanes, and polysilsesquioxanes from the T units.

The coating composition cures through the crosslinking of the epoxy groups in the E group of the resin to provide a coating which is weather and chemical resistant. The polysiloxane moieties in the resin render the cured coating resistant to U.V. light and heat.

BEST MODE FOR CARRYING OUT THE INVENTION

The coating composition of the present invention comprises a binder and a hardener. The coating composition may also comprise flow additives, a crosslinking reaction catalyst to increase the rate of reaction, pigment to impart color to the coating, wetting agents, surface modifiers, extenders and inerts, and other commonly used coating composition ingredients.

Preferably, the coating composition comprises about 10 to about 90 weight percent binder, based on the total weight of the coating composition. More preferably, the coating composition comprises about 25 to about 50 weight percent binder, based on the total weight of the coating composition.

The binder preferably comprises at least about 80 weight percent solids, based on the weight of the binder, and more preferably, at least about 90 weight percent solids.

The binder preferably comprises a mildly crosslinked, addition-crosslinkable epoxy-functional organopolysiloxane resin which contains at least one or more of the repeating units having the formulae:

| | |
|---|---|
| $E_aR_b{}^1R_c{}^2SiO_{1/2}$ | (M units) |
| $E_aR_b{}^1R_c{}^2SiO_{2/2}$ | (D units) |
| $E_aR_b{}^1R_c{}^2SiO_{3/2}$ | (T units) |
| $SiO_{4/2}$ | (Q units) | wherein

E is an epoxy-functional $C_{1-8}$ hydrocarbon group containing one or more oxygen atoms, provided that no oxygen atom is directly bonded to a S-atom; and

-continued

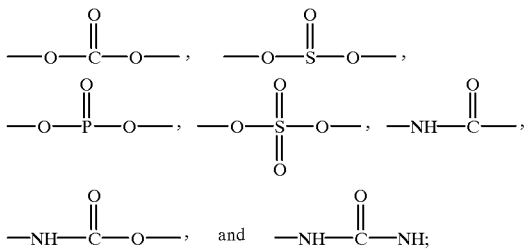

a is an integer of 0, 1 or 2, preferably 0 or 1;
b is an integer of 0, 1, 2 or 3, preferably 0, 1, or 2;
c is an integer of 0, 1, 2 or 3, preferably 0, 1, or 2; and
in M units, a+b+c=3,
in D units, a+b+c=2,
in T units, a+b+c=1,
with the proviso that the molecule, on average, contain at least two E components.

E is preferably an epoxy-functional $C_{2-15}$ hydrocarbon group, more preferably a $C_{3-12}$ hydrocarbon group, and even more preferably a $C_{3-6}$ hydrocarbon group. E is preferably glycidoxypropyl

$(CH_2\text{—}CHCH_2OCH_2CH_2CH_2\text{—})$.

Preferably, the $R^1$ and $R^2$ are individually $C_{1-18}$ alkyl, $C_{6-20}$ aryl, $C_{7-18}$ alkylaryl, $C_{7-18}$ arylalkyl, $C_{5-12}$ cycloalkyl, $C_{2-18}$ alkenyl, glycol, epoxy (provided that the oxygen atom is not bonded directly to a Si-atom), $C_{1-18}$ alkoxy, $C_{2-20}$ unsaturated hydrocarbons such as vinyl, allyl, propenyl, isopropenyl and terminal $C_{4-18}$ alkenyl, alkynyl, vinyl ether, and allyl ether groups.

More preferably, $R^1$ and $R^2$ are independently methyl, ethyl, vinyl, allyl, methoxy, ethoxy, and phenyl groups.

If T units are present, the molecule may contain or form silsesquisiloxanes, and polysilsesquioxanes from the T units.

The organopolysiloxanes may be terminated with conventional end groups, such as trialkylsilyl, dialkylsilanolyl, dialkylalkoxysilyl, alkyldialkoxysilyl, dialkylvinylsilyl, and the like.

The epoxy-functional organopolysiloxane resin preferably comprises less than about 15 mole percent Q units, between about 30 and about 100 mole percent T units, less than about 40 mole percent M units, and less than about 40 mole percent D units, based on the total number of moles of the epoxy-functional organopolysiloxane resin. More preferably, the epoxy-functional organopolysiloxane resin comprises less than about 10 mole percent Q units, between about 45 and about 80 mole percent T units, less than about 15 mole percent M units, and less than about 15 mole percent D units, based on the total number of moles of the epoxy-functional organopolysiloxane resin. Most preferably, the epoxy-functional organopolysiloxane resin comprises about 70 mole percent T units and, about 30 mole percent D units, based on the total number of moles of the epoxy-functional organopolysiloxane resin.

Preferably, the epoxy-functional organopolysiloxane resin has an alkoxy content of less than about 20 weight percent, based on the weight of the epoxy-functional organopolysiloxane resin, more preferably less than about 18 weight percent, and most preferably at, or less than, about 15 weight percent.

The epoxy-functional organopolysiloxane resin is preferably a liquid having a molecular weight of about 500 to about 5,000, more preferably about 750 to about 5,000, and most preferably about 1200. The viscosity of the epoxy-functional organopolysiloxane resin is preferably between about 200–70,000 cps with the most preferred range being 13,000–20,000 cps.

In a less preferred embodiment, the epoxy-functional organopolysiloxane resin is a solid and has a molecular weight of less than about 25,000, more preferably less than about 20,000, and most preferably less than about 15,000. When the epoxy-functional organopolysiloxane resin is a solid, the resin is dissolved in a suitable solvent, such as xylene, toluene, and other suitable aromatic, ketone and ester solvent for making appropriate coating compositions.

While the epoxy-functional organopolysiloxane resin must have at least two epoxy groups per molecule, preferably the epoxy-functional organopolysiloxane resin has three or four epoxy groups per molecule. More preferably, the epoxy equivalent weight of the epoxy-functional organopolysiloxane resin is in the range of about 150–1000 with the preferred range being about 200–600.

The epoxy-functional organopolysiloxane resin of the present invention may be represented by the formula:

(I)

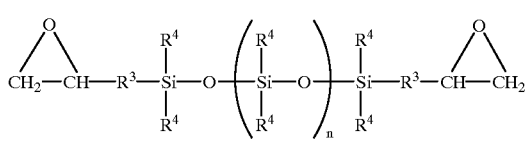

Where $R^3$ can be composed of alkylene ($C_1$–$C_8$), optionally interspersed with oxygen (provided that the oxygen is not bonded to the S- group) and arylene groups; $R^4$ can be independently chosen from one of the following groups: alkyl, aryl, vinyl, glycol, alkoxy ($C_1$–$C_8$), and epoxy (provided that the oxygen is not bonded to the Si- group); with n being greater than or equal to 1.

The epoxy-functional organopolysiloxane resin of the present invention may be prepared by any known method and is preferably prepared by reacting an epoxy functional silane (i.e., a silane having minimally at least one epoxy group per molecule) with a silicone polymer.

Suitable silicone polymers may include M,D,T, &/or Q units as are known in the art and preferably have a molecular weight (MW) from about 300 to about 15,000, more preferably from about 1000 and 2500, and most preferably from about 1000 to about 2000. Preferably the silicone has an alkoxy equivalent weight of about 150 to about 800, more preferably about 200 to about 600.

Suitable epoxy functional silanes are represented by the formula:

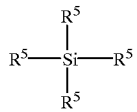

wherein $R^5$ are one of, or a combination of, the following groups alkyl ($C_{1-12}$), aryl ($C_{6-9}$), vinyl, glycol, alkoxy ($C_{1-12}$), and an epoxy functional $C_{1-18}$ hydrocarbon group of the formula $R^6$–$E^1$ wherein $E^1$ comprises an epoxy group and $R^6$ comprises a $C_{1-18}$ hydrocarbon group, with the proviso that at least one $R^5$ comprises $R^6$–$E^1$.

It should be noted that the $R^6$ hydrocarbon group may optionally be interspersed with at least one heteroatom linking group such as, but not limited to, —O—, —S—, and —NH—, provided that no heteroatom linking group is adjacent to the $E^1$ group. $R^6$ preferably comprises a $C_{3-12}$ hydrocarbon group, and most preferably a $C_{3-6}$ hydrocarbon group.

Preferably, $R^6$–$E^1$ is glycidoxy propyl

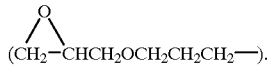

Preferably, the silane has a molecular weight from about 100 to about 750, more preferably about 150 to about 500, and most preferably about 180 to about 350. The silane preferably has an epoxy functionality of from about 1 to about 10, more preferably 1 to about 5, and most preferably about 1. The silane has an alkoxy functionality of from about 1 to about 10, more preferably 1 to about 5, and most preferably about 3.

The types of silanes used will determine the final application. Preferably, the silane is a γ-glycidoxypropylsilane having $C_{1-18}$ alkoxy groups. A preferred silane is γ-glycidoxypropyltrimethoxysilane (OSi, A187). Most preferably, the silane is γ-glycidoxypropyltriethoxysilane (Wacker GF-82). The use of γ-glycidoxypropyltriethoxysilane will incorporate covalently bonded epoxy functionality without having a hydrolyzable Si—OC bond. The addition of silanes or polysiloxanes that contain alkyl, aryl, or glycol substituents will increase the compatibility and high temperature resistance of the polymer.

The silicone polymer and the epoxy functional silane reaction is a condensation reaction and takes place in water as is known in the art. Preferably, a sufficient amount of water is provided to result in the epoxy-functional organopolysiloxane resin having an alkoxy content of less than about 20 weight percent, more preferably less than about 15 weight percent, and most preferably at or less than about 10 weight percent.

While the binder may comprise 100 percent of the epoxy-functional organopolysiloxane resin, the binder preferably includes acrylic resin to reduce the unit cost of the binder. Preferably the epoxy-functional polysiloxane resin is present in the binder in an amount of about 5 to about 75 weight percent of the total weight of the binder. More preferably about 10 to about 25 weight percent, and most preferably about 15 weight percent. Preferably, the acrylic resin is present in the binder in an amount of about 25 to about 95 weight percent of the total weight of the binder, more preferably about 75 to about 90 weight percent, and most preferably about 85 weight percent.

The acrylic resin may include, but is not limited to, those resins produced from one or more monomers such as methyl methacrylate, ethyl methacrylate, propyl methacrylate, isobutyl methacrylate, and n-butyl methacrylate. Such materials can be used separately or as polymer blends. A particularly preferred acrylic resin is B44 from Rohm and Haas. The acrylic resin is preferably supplied in pellets and is dissolved into solution prior to being mixed with the epoxy-functional siloxane resin. The acrylic resin may cure through chain entanglement or coalescence, as it preferably does not have any functional groups for cross-linking.

The hardener component is preferably present in the coating composition of the present invention in an amount of about 2 to about 25 weight percent, based on the total weight of the coating composition. More preferably, the hardener component is present in the coating composition of the present invention in an amount of about 8 to about 17 weight percent, based on the total weight of the coating composition.

Preferred hardeners include, but are not limited to, any one or a combination of the following: acids, for example, phosphoric acid; amines such as aliphatic amines; aliphatic amine adducts; polyamidoamines; cycloaliphatic amines and cycloaliphatic amine adducts; aromatic amines; alkyl amines with at least one reactive hydrogen; Mannich bases; ketimines, and hydroxyl groups of reacted epoxy on siloxane polymers; mercapto- and phospho-containing compounds. A preferred hardener component comprises a difunctional amine, i.e., an amine having two active hydrogens, which may be substituted wholly or in part with an aminosilane having the general formula:

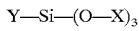

where Y is $H(HNR^7)_a$, and where "a" is equal to one, each $R^7$ is a difunctional organic radical independently selected from the group consisting of aryl, alkyl, dialkylaryl, alkoxyalkyl, and cycloalkyl radicals, and where $R^7$ can vary within each Y molecule. Each X can be the same or different, and is limited to alkyl, hydroxalkyl, alkoxyalkyl and hydroxyalkoxyalkyl groups containing less than about six carbon atoms. At least about 0.5 to about 1.2, and preferably about 0.7 equivalents of amine or about 0.05 to about 0.5, and preferably about 0.4 moles of aminosilane per equivalent of epoxy may be present in the hardener component.

Preferred aminosilanes include, but are not limited to: aminoethylaminopropyltriethoxysilane, N-phenylaminopropyltrimethoxysilane, trimethoxysilylpropyl diethylene triamine, 3-(3-aminophenoxy)propyl trimethoxy silane, aminoethylaminomethylphenyltrimethoxy silane, 2-aminoethyl-3-aminopropyltris [2 ethyl hexoxy] silane, N-aminohexylaminopropyltrimethoxysilane and tris [aminopropyl] tris[methoxy] ethoxy silane.

Other preferred aminosilanes are difunctional silanes that include aminopropyltrimethoxysilane and aminopropyltriethoxysilane. A difunctional aminosilane is desired because it has been found that the combination of an aminosilane having a reactivity of two, i.e., having only two amine hydrogens, reacts with the non-aromatic epoxy, also having a reactivity of two, to form a linear epoxy polymer that displays improved weatherability.

Such preferred amines and aminosilanes produce epoxy-polysiloxane compositions that, when applied as a substrate coating, exhibit superior weatherability in terms of both color and gloss retention. Specific examples of preferred aminosilanes include Wacker ADDID 900, ADDID 901, Dow 6020, OSi A1100, OSi A1110, OSi A1120, OSi A1130, OSi A1387, and Y9632.

To increase the rate of the crosslinking reaction, a catalyst may be used. If a catalyst is used, preferably it is present in the coating composition in an amount of up to about 5 weight percent, based on the weight of the coating composition.

Suitable catalysts are hydrochloric acid, (HCl), sulfuric acid ($H_2SO_4$) and potassium hydroxide (KOH). Examples of other suitable catalysts include compounds containing aluminum, zinc, manganese, zirconium, titanium, cobalt, iron, lead and tin. Suitable catalysts may also include organotin catalysts. Dibutyltin dilaurate, dibutyltin diacetate, organotitanates, sodium acetate, and amines, such as aliphatic secondary or tertiary polyamines including propylamine, ethylaminoethanol, triethanolamine, triethylamine, and methyldiethanolamine which may be used alone or in combination.

The coating composition may also include flow additives. Examples of suitable flow additives include, but are not limited to, silicone, polyester and acrylic flow additives. If flow additives are present, they may be present in the coating composition in an amount of less than about 8 weight percent, based on the total weight of the coating composition. More preferably, flow additives are present in the coating composition in an amount of less than about 5 weight percent, and most preferably about 3 weight percent, based on the total weight of the coating composition.

A preferred coating composition may comprise up to about 50 percent by weight fine particle size pigment and/or aggregate, based on the total weight of the coating composition. Using greater than 50 percent by weight fine particle size pigment and/or aggregate ingredient can produce a composition that is too viscous for application. Depending on the particular end use, a preferred coating composition may comprise approximately 20 percent by weight fine particle size aggregate and/or pigment. The pigment and/or aggregate ingredients useful in forming the composition are selected from a fine particle size material, preferably having at least 90 weight percent greater than 325 mesh U.S. sieve size.

Suitable pigments may be selected from organic and inorganic color pigments which may include titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like. The amount of pigment that is used to form the composition is understood to vary, depending on the particular composition application, and can be zero when a clear composition is desired.

The pigment and/or aggregate ingredient is typically added to the binder, and more preferably the epoxy-functional organopolysiloxane resin portion of the binder, and is dispersed with a Cowles mixer to at least 3 Hegman fineness of grind, or alternatively is ball milled or sand milled to the same fineness of grind. Selection of a fine particle size pigment or aggregate and dispersion or milling to about 3 Hegman grind allows for the atomization of mixed resin and cure components with conventional spray equipment, and provides a smooth, uniform surface appearance after application.

The coating compositions of the present invention are generally low enough viscosity that they can be spray applied, if desired, without the addition of a solvent. However, organic solvents may be added to improve atomization and application with electrostatic spray equipment or to improve flow and leveling and appearance when applied by brush, roller, or standard air and airless spray equipment. Exemplary solvents useful for this purpose include esters, ethers, alcohols, ketones, glycols and the like. If desired, up to about 50 percent by weight of solvent can be present in the coating composition, based on the total weight of the coating composition. Preferably, in the range of from about 10 to 20 percent by weight of the organic solvent is used to conform to governmental regulations that govern the extent of the volatile organic compound emissions.

The coating compositions of the present invention may also contain other rheological modifiers, plasticizers, antifoam agents, thixotropic agents, pigment wetting agents, bituminous and asphaltic extenders, antisettling agents, diluents, UV light stabilizers, air release agents and dispersing aids.

The coating compositions of the present invention are supplied as a two-package system in moisture proof containers. One package contains the binder, any pigment and/or aggregate ingredient, additives and solvent if desired. The second package contains the hardener and any optional catalysts or accelerating agents.

The coating composition can be applied by conventional application techniques, such as by brush, roll or spray. The compositions are intended to be used as protective coatings for steel, galvanizing, aluminum, concrete and other substrates at dry film thicknesses in the range of from 25 micrometers to about two millimeters.

The coating compositions of the present invention can be applied and fully cure at ambient temperature conditions in the range of from about −6° C. to 50° C. At temperatures below −18° C., cure is severely retarded. However, compositions of the present invention may be applied under bake or cure temperatures up to 150° C. to 200° C.

The epoxy-functional organopolysiloxane resin of the present invention cures to form a U.V. light, heat and corrosion resistant coating by crosslinking, at room temperature, through the epoxy groups through the following addition reaction:

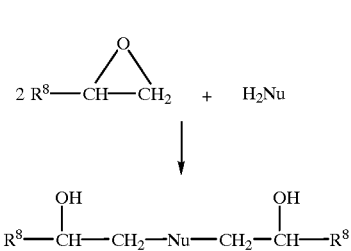

(II)

Where $R^8$ comprises the residue of the epoxy-functional organopolysiloxane resin and $H_2Nu$ represents a nucleophile having 2 hydrogen atoms, and can consist of one or a combination of the following: amine, polyamidoamine, polyamide, alkylamine with at least two reactive hydrogens, aminosilane such as Wacker ADDID 900, ADDID 901, Dow Z-6020, OSi A1100, OSi A1110, OSi A1120, OSi A 1130, OSi A1387, Y9632, and hydroxyl groups of reacted epoxy on the siloxane polymer, mercapto, and phospho containing compounds.

The reaction of the nucleophile with the epoxy component will form a covalent bond. This covalent bonding will continue until all the reactive groups have been depleted or the molecular weight of the polymer has increased to a point at which it is no longer mobile. This will be the binder to the coating, and within this pigments, extenders, inerts, wetting agents, surface modifiers and other components may be suspended either in solution or in a dry film. Since the crosslinking occurs by addition, no by-products, such as alcohol, are formed.

The polysiloxane moieties, and in particular the Si- bonds, in the organopolysiloxane resin renders the resulting coating resistant to U.V. light and heat. The alkyl and aryl substituents of the organopolysiloxane resin provides for good compatibility of the resin with organic systems as well as increased water and heat resistance. The coating composition cures through the crosslinking of the epoxy groups in the resin.

Having generally described this invention, a further understanding can be obtained by reference to certain specific examples which are provided herein for purposes of illustration only and are not intended to be limiting unless otherwise specified.

EXAMPLES

Example Resin Formulation 1

Methylphenyldimethoxysilane, in an amount of 60.90 grams, is blended with 167.43 grams of phenyltrimethoxysilane, 21.67 grams of dimethyldimethoxysilane, and 24.88 grams of de-ionized water in a three necked round bottom flask and mixed until homogeneous. 1.37 grams of a 19% solution of KOH is added to the mixture. The mixture is heated to 80° C. and held until 79.22 grams (101.5 ml) of alcohol is collected.

186.53 grams of γ-glycidoxypropyltriethoxysilane and 17.13 grams of de-ionized water are blended into the above reaction product and mixed until homogeneous. The resulting mixture is heated to 80° C. and refluxed until 70.19 grams (90.75 ml) of alcohol are collected. The final product is a yellow liquid with a viscosity, which is approximately 18,590 cps using a brookfield viscometer with a spindle #6 at 20 rpm. The solids content of the solution is 93.11% by weight after reaction of the residual alkoxy groups. The alkoxy content of the resin is about 13%. The epoxy equivalent weight is about 492.

Example Resin Formulation 2

Same as example 1.

The polymer has a solids content of 93.09% by weight after reaction of the residual alkoxy groups. The alkoxy content of the resin is about 13%. The epoxy equivalent weight is about 490.

Example Resin Formulation 3

Same as example 2 with the addition of 7.02 grams of de-ionized water during the last step collected after reflux 19.84 g of alcohol. The alkoxy content of the resin is about 8%. The epoxy equivalent weight is about 480.

Example Coating Formulation 1

The coating is made by mixing 145.0 grams of the silicone polymer from example resin formulation 2 with 145.0 grams of white pigment (Dupont R960) in a stainless steel container and grinding to a Hegman of >7. 1.16 grams of ADDID® 160 (Wacker Silicones Corporation) is blended into the mixture. The epoxy functional silicone is cured by mixing 23.56 grams of the aminosilane hardener ADDID® 900 (Wacker Silicones Corporation).

The above formulation is applied to cold rolled steel panels with a wire wound rod to a dry film thickness of 1.1–2.5 mils. The physical testing and QUV resistance is measured after air drying for 24 hours.

Example Coating Formulation 2

Same as example coating formulation 1 except that the example resin formulation 1 is replaced with example resin formulation 2, and the amount of ADDID® 900 is decreased to 19.09 grams.

The above formulations are applied to cold rolled steel panels using a wire wound rod to a dry film thickness of 1.1–2.5 mils. The physical testing and QUV resistance are measured after air drying for 24 hours.

Example Coating Formulation 3

145.0 grams of the silicone polymer from example resin formulation 3 is blended with 145.0 grams of white pigment (Dupont R960) in a stainless steel container and grinding to a Hegman of >7. 1.16 grams of ADDID® 160 (Wacker Silicones Corporation) is blended with the mixture. The epoxy functional silicone is cured by mixing 23.56 grams of the aminosilane hardener ADDID® 900 (Wacker Silicones Corporations).

The above formulations are applied to cold rolled steel panels using a wire wound rod to a dry film thickness of 1.1–2.5 mils. The physical testing and QUV resistance are measured after air drying for 24 hours.

The gloss was measured according to ASTM D 523-89 by quantifying the amount of light reflected off the film. The Delta E was measured according to ASTM D 4587 by quantifying the level of color change of the film after exposure to ultraviolet light for 872 hours. The gloss retention was measured according to ASTMD 4587 by comparing the amount of light reflected off the film after exposure to ultraviolet light for 872 hours to the amount of light reflected off prior to exposure to ultraviolet light.

The results of the testing of Examples 1–3 are shown in Table 1 below:

TABLE 1

Physical testing of Examples

| Test | Example 1 | Example 2 | Example 3 |
|---|---|---|---|
| Gloss 60 degree[1] (Appearance) | 85 | 95 | 100 |
| Pencil Hardness[2]: | B | 5B | F |
| Chemical Resistance[3]: | | | |
| IPA | >50 | >50 | >50 |
| MEK | 17 | 45 | >50 |
| QUV B-872 hours[4]: | | | |
| Delta E | 1.3 | 1.4 | 1.2 |
| Gloss retention (60 degree) | 90% | 93% | 95% |
| Film Thickness (mils)[5]: | 1.48 | 2.12 | 2.52 |

[1]According to ASTM D 523-89
[2]According to ASTM D 3363-74
[3]According to ASTM D 4752-87
[4]According to ASTM D 4587
[5]Measured via an Elektro Physik The coating compositions of the present invention will preferably have a gloss, when measured in accordance with ASTM D 523-89, of at least about 85, more preferably at least about 90, even more preferably at least about 95, and most preferably about 100. Moreover, the coating compositions of the present invention will preferably have a pencil hardness, when measured in accordance with ASTM D 3363-74, of at least about 6B, more preferably at least about B, and even more preferably at least about HB, and most preferably at least about F.

Furthermore, the coating compositions of the present invention will preferably have a Delta E, when measured in accordance with ASTM D 4587, less than about 3.0, more preferably less than about 2.0, and most preferably less than about 1.5. Also, the coating compositions of the present invention will preferably have a gloss retention, when measured in accordance with ASTM D 4587, of at least about 85%, more preferably at least about 90%, and most preferably at least about 95%.

Comparative Examples

Comparative Example Coating Formulation C1

Methylphenyldimethoxysilane, in an amount of 108.13 grams, is blended with 234.77 grams of phenyltrimethoxysilane in a stainless steel container and mixed until homogeneous. 2.0 grams of hydrophilic fumed silica (Wacker HDK N20) and 120 grams of iron oxide (Miles 303T) are added to the mixture. The mixture is then ground to >7.0 Hegman.

104.72 grams of methylphenyldimethoxysilane is then blended with 227.37 grams of phenyltrimethoxysilane and 108.9 grams of MICA 325 and the resulting mixture is mixed until homogeneous. 2.0 grams of a silicone additive (ADDID 170) and 27.00 grams of tetrabutyltitanate (TYZOR TBT-Dupont) are then added.

The above formulation is applied to cold rolled steel panels using a wire wound rod to a dry film thickness of 1.1–2.5 mils. The physical testing and QUV resistance is measured after air drying for 24 hours.

Comparative Example Coating Formulation C2

Methylphenyldimethoxysilane, in an amount of 81.10 grams, is blended with 227.51 grams of phenyltrimethoxysilane, and 34.28 grams of dimethyldimethoxysilane in a stainless steel container and mixed until homogeneous. 2.0 grams of hydrophilic fumed silica (Wacker HDK N20) and 120 grams of iron oxide (Miles 303T) are added to the mixture. The mixture is then ground to >7.0 Hegman.

78.62 grams of methylphenyldimethoxysilane is then blended with 220.65 grams of phenyltrimethoxysilane, 33.45 grams of dimethyldimethoxysilane and 108.9 grams of MICA 325.

The resulting mixture is then mixed until homogeneous. 2.0 grams of a silicone additive (ADDID 170) and 27.00 grams of tetrabutyltitanate (TYZOR TBT-Dupont) are then added.

The above formulation is applied to cold rolled steel panels using a wire wound rod to a dry film thickness of 1.1–2.5 mils. The physical testing and QUV resistance is measured after air drying for 24 hours.

Comparative Example Coating Formulation C3

342.90 grams of a 50% solution of acrylic (Rhom and Haas B44), is blended with 2.0 grams hydrophilic fumed silica (Wacker HDK N20) and 120 grams of iron oxide (Miles 303T) in a stainless steel container and mixed until homogeneous. The mixture is then ground to >7.0 Hegman.

602.10 grams of the same 50% solution of acrylic (Rhom and Haas B44) as above is then blended in with 108.9 grams of MICA 325, and the resulting mixture is then mixed until homogeneous. 2.0 grams of silicone additive (ADDID 170) is then added with the resulting mixture being mixed for an additional 15 minutes.

The above formulations are applied to cold rolled steel panels using a wire wound rod to a dry film thickness of 1.1–2.5 mils. The physical testing and QUV resistance are measured after air drying for 24 hours.

The results of the testing of Comparative Examples C1–C3 are shown in Table 2 below:

TABLE 2

Physical testing of Comparative Examples

| Test | Example C1 | Example C2 | Example C3 |
|---|---|---|---|
| Gloss 60[1] (Appearance) | 4 | 12 | 23 |
| Pencil Hardness[2]: | >2H | >2H | >2H |
| Chemical Resistance[3]: | | | |
| IPA | 20 | 16 | 17 |
| MEK | 7 | 7 | 4 |
| QUV B-872 hours[4]: | | | |
| Delta E | 1.5 | .4 | 3.0 |
| Gloss retention (60 degree) | 75% | 67% | 56% |
| | | very low initial gloss | |
| Film Thickness (mils)[5]: | 1 | 1 | 1 |

[1] According to ASTM D523-89
[2] According to ASTM D3363-74
[3] According to ASTM D4752-87
[4] According to ASTM D4587
[5] Measured via an Elektro Physik While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An epoxy-functional organopolysiloxane coating composition comprising:

a hardener;

an epoxy-functional organopolysiloxane resin which contains at least one or more repeating units having the formulae:

 (M units)

 (D units)

 (T units)

 (Q units)

wherein

E an epoxy-functional $C_{1-18}$ hydrocarbon group containing one or more oxygen atoms, provided that no oxygen atom is directly bonded to a S- atom; and $R^1$ and $R^2$ are independently a $C_{1-20}$ hydrocarbon, optionally interspersed with a heteroatom linking group;

a is an integer of 0, 1, or 2;

b is an integer of 0, 1, 2 or 3;

c is an integer of 0, 1, 2 or 3; and in M units, a+b+c=3, in D units, a+b+c=2, in T units, a+b+c=1, wherein the M units are present in less than about 40 mole percent;

the D units are present in an amount of up to about 40 mole percent;

with the proviso that the molecule, on average, contains at least two E components; and an acrylic resin;

wherein the resin is a liquid having a molecular weight of about 500 to about 5000.

2. The epoxy-functional organopolysiloxane coating composition of claim 1 wherein the resin comprises about 70 mole percent T units and about 30 mole percent D units, based on the total number of moles of the resin.

3. The epoxy-functional organopolysiloxane coating composition of claim 1 wherein the resin is present in an amount of about 10 to about 90 weight percent, based on the total weight of the coating composition.

4. An epoxy-functional organopolysiloxane coating composition comprising:

a hardener;

an epoxy-functional organopolysiloxae resin which contains at least one or more of the repeating units having the formulae:

 (M units)

 (D units)

 (T units)

 (Q units)

wherein

E is an epoxy-functional $C_{1-18}$ hydrocarbon group conning one or more oxygen atoms, provided tat no oxygen atom is directly bonded to a S- atom; and $R^1$ and $R^2$ are independently a $C_{1-20}$ hydrocarbon, optionally interspersed with a heteroatom linking group;

a is an integer of 0, 1, or 2;

b is an integer of 0, 1, 2 or 3;

c is an integer of 0, 1, 2 or 3; and in M units, a+b+c=3, in D units, a+b+c=2, in T units, a+b+c=1, wherein the M units are present in less than about 40 mole percent;

the D units are present in an amount of up to about 40 mole percent;

with the proviso that the molecule, on average, contains at least two E components; and a flow additive;

wherein the resin is a liquid having a molecular weight of about 500 to about 5000.

5. The epoxy-functional organopolysiloxane coating composition of claim 4 wherein the resin comprises about 70 mole percent T units and about 30 mole percent D units, based on the total number of moles of the resin.

6. The epoxy-functional organopolysiloxane coating composition of claim 4 wherein the resin is present In an amount of about 10 to about 90 weight percent, based on the total weight of the coating composition.

7. An epoxy-functional organopolysiloxane coating composition, the coating composition comprising a hardener and an epoxy-functional organopolysiloxane resin prepared by reacting an epoxy-functional silane with a silicone resin, the epoxy-functional silane and the silicone resin being provided in effective amounts so that the epoxy-functional organopolysiloxane coating composition is sufficiently flexible to adhere to a metal panel without cracking off the panel after undergoing QTVB-872 hour testing according to ASTM D 4587, wherein the resin is a liquid hayg a molecular weight of about 500 to about 5000.

8. The epoxy-functional organopolysiloxne coating composition of claim 7, wherein the resin comprises about 70 mole percent T units and about 30 mole percent D units, based on the total number of moles of the resin.

9. The epoxy-functional organopolysiloxane coating composition of claim 7, wherein the resin is present in an amount of about 10 to about 90 weight percent, based on the total weight of the coating composition.

10. The epoxy-functional organopolysiloxane coating composition of claim 7 wherein the coating composition has a gloss retention of at least about 85% after undergoing QUV B-872 hour-testing according to ASTH D 4587.

11. The epoxy-functional organopolysiloxane coating composition of claim 10 wherein the coating composition has a Delta E of less than at least about 3.0 after undergoing QUV B-872 hour testing according to ASTM D 4587.

12. The epoxy-functional organopolysiloxane coating composition of claim 11 wherein the epoxy-functional resin contains at least one or more of the repeating units of having the formulae:

| | |
|---|---|
| $E_a R_b^1 R_c^2 SiO_{1/2}$ | (M units) |
| $E_a R_b^1 R_c^2 SiO_{2/2}$ | (D units) |
| $E_a R_b^1 R_c^2 SiO_{3/2}$ | (T units) |
| $SiO_{4/2}$ | (Q units) | wherein

E is an epoxy-tbctional $C_{1-18}$ hydrocarbon group containing one or more oxygen atom, provided that no oxygen atom is directly bonded to a S- atom; and $R^1$ and $R^2$ are independendy a $C_{1-20}$ hydrocarbon, optionally interspersed with a heteroatom linking group;

a is an inter of 4, 1, or 2;

b is an integer of 0, 1, 2 or 3;

c is an integer of 0, 1, 2 or 3; and in M units, a+b+c=3, in D units, a+b+c=2, in T units, a+b+c=1, wherein the M units are present in less than about 40 mole percent;

the D units are present in an amount of up to about 40 mole percent; and with the proviso that the molecule, on average, contains at least two E components.

13. The epoxy-functional organopolysiloxane coating composition of claim 12 wherein the silane is represented by the formula:

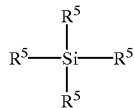

wherein each $R^5$ is individually selected from the group consisting of aykyl ($C_{1-12}$), aryl ($C_{6-9}$), vinyl, glycol, alkyl ($C_{1-12}$), and an epoxy functional $C_{1-18}$ hydrocarbon group of the formula $R^6-E^1$ wherein $E^1$ comprises an epoxy group and $R^6$ comprises a $C_{1-18}$ hydrocarbon group optionally interspersed with at least one heteroatom linking group, with the proviso that at least one $R^5$ comprises $R^6-E^1$.

* * * * *

UNITED STATES PATENT AND TRADEMARK OFFICE
CERTIFICATE OF CORRECTION

PATENT NO. : 6,344,520 B1
DATED : February 5, 2002
INVENTOR(S) : James D. Greene It is certified that error appears in the above-identified patent and that said Letters Patent is hereby corrected as shown below:

Title page,
Item [54], correct the title from "ADDITION-CROSSLINKABLE EPOXY-FUNCTIONAL ORGANOPOLYSILOXANE POLYMER AND COATING COMPOSITIONS" to -- ADDITION CROSSLINKABLE EPOXY-FUNCTIONAL ORGANOPOLYSILOXANE POLYMER COATING COMPOSITIONS --.

Column 13,
Line 50, please replace "S- atom" to -- Si- atom --.

Column 14,
Line 16, please replace "organopolysiloxae" with -- organopolysiloxane --.

Column 14,
Line 24, please replace

"    (T units) "

with

-- 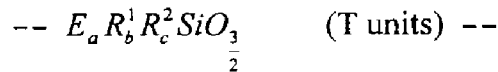   (T units) --

Line 29, please replace "con-ning" with -- containing --.
Line 30, please replace "provided tat" with -- provided that --.
Line 31, please replace "S- atom" with -- Si atom --.

Column 15,
Line 2, please replace "QTVB-872" with -- QUV B-872 --.
Line 3, please replace "hayg" with -- having --.
Line 5, please replace "organopolysiloxne" with -- organopolysiloxane --.

UNITED STATES PATENT AND TRADEMARK OFFICE
CERTIFICATE OF CORRECTION

PATENT NO. : 6,344,520 B1
DATED : February 5, 2002
INVENTOR(S) : James D. Greene It is certified that error appears in the above-identified patent and that said Letters Patent is hereby corrected as shown below:

Column 15 cont'd.
Line 16, please replace "ASTH D 4587" with -- ASTM D 4587 --.
Line 35, please replace "tbctional" with -- functional --.
Line 37, please replace "S-atom" with -- Si- atom --.

Column 16,
Line 3, please replace "a is an inter of 4, 1, or 2" with -- a is an integer of 0, 1, or 2 --.
Line 29, please replace "aykyl" with -- alkyl --.
Line 30, please replace "alkyl" with -- alkoxy --.

Signed and Sealed this

Tenth Day of September, 2002

Attest:

JAMES E. ROGAN
Attesting Officer
Director of the United States Patent and Trademark Office